Sept. 7, 1926.  
G. E. PHILLIPS  
CORNER GLARESHIELD  
Filed Sept. 2, 1924  
1,599,183

INVENTOR  
GEORGE E. PHILLIPS.  
BY  
ATTORNEYS.

Patented Sept. 7, 1926.

1,599,183

UNITED STATES PATENT OFFICE.

GEORGE E. PHILLIPS, OF IMOLA, CALIFORNIA.

CORNER GLARESHIELD.

Application filed September 2, 1924. Serial No. 735,411.

This invention relates to anti-glare shields as used on automobiles to shield the driver's eyes against the glare of the setting or rising sun and has to do with improvements over a glare shield of similar construction filed by me under Serial No. 724,645, and date of July 7, 1924.

The principal object of my improvements hereunder is to provide a glare shield which will simultaneously shield both the front and side vision of the driver so that when the sun is directed to the corner of the machine, or when on roads making sudden turns, the shifting light will at all times be screened from the driver's eyes.

Figure 1:
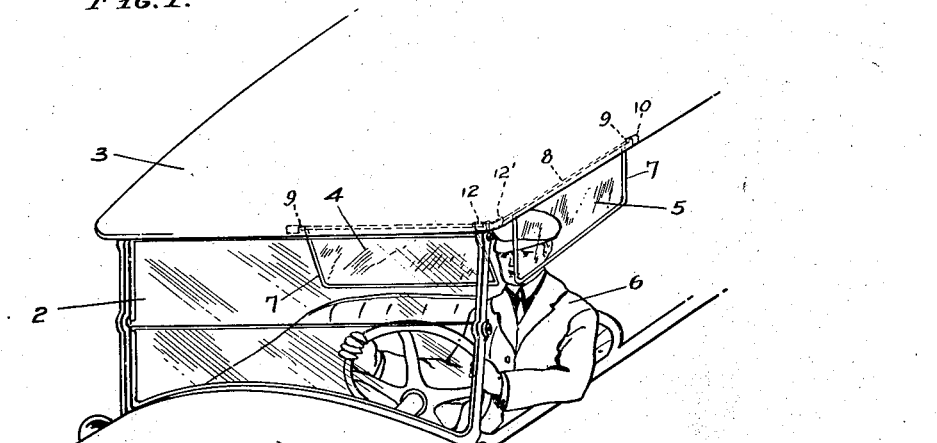
Figure 2:
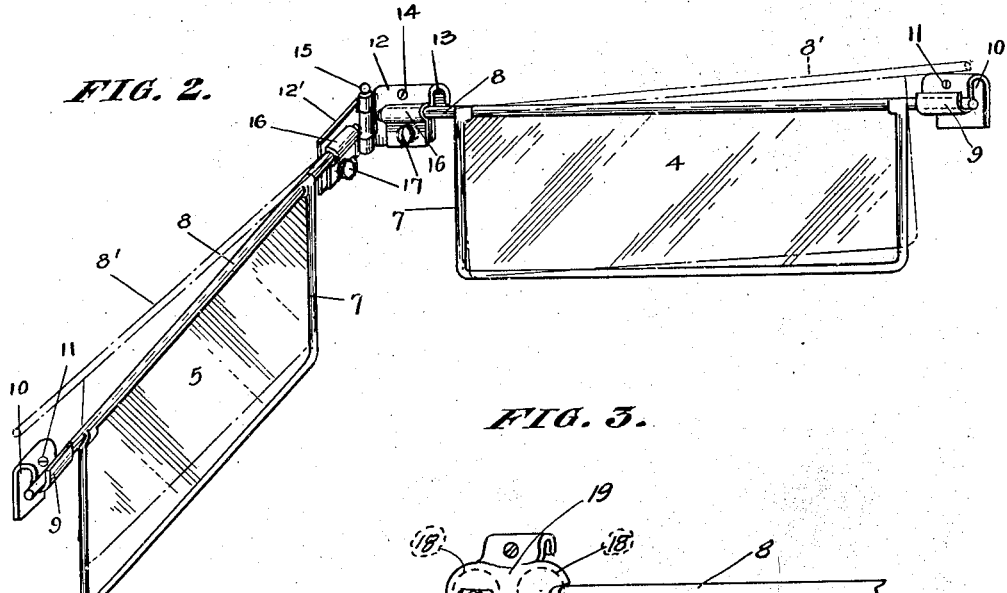
Figure 3:
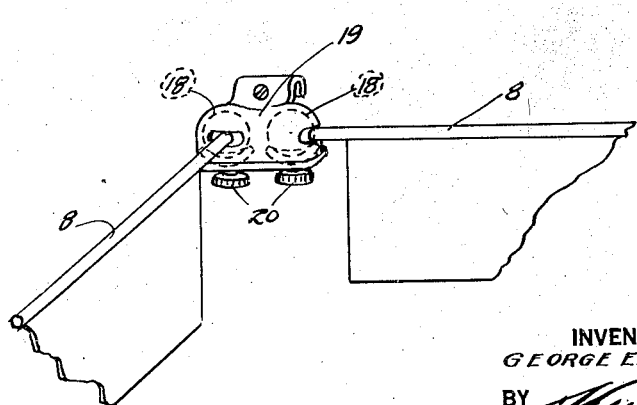

In the drawings hereto my improvements are shown completely installed on an automobile in Figure 1, and in Figure 2 is shown an enlarged perspective view of the double shield as seen from inside the automobile with the windshield and top frame omitted. Figure 3 shows a double ball joint corner support.

Briefly described my improvements consists of providing two sheets of anti-glare material, colored glass preferred, and suspending them on suitable folding brackets from either the windshield frame, or automobile top frame, or both, so that the shields co-operate with the said frames in effecting an anti-glare enclosed corner protecting the driver simultaneously from low, direct and reflected light rays coming from either or both directions.

In my previous construction referred to, or in any other with which I am familiar, the side glare could only be taken care of by bodily shifting the shield from front to side and no arrangement provided the enclosed anti-glare corner as described.

In detail my preferred construction embodies features adapting my device to be quickly attached to any automobile and care for any particular angle which the windshield and side of the machine may present, as well as permit the usual relative movement of the top frame to the windshield frame due to the vibration and flexing of the top construction in use.

In Figure 1 the automobile is indicated at 1, its windshield at 2, and its top at 3, the front glare sheet 4 and side glare sheet 5.

The front sheet is shown as slightly tipped downward toward the driver, whereas the side sheet is indicated as hanging vertically, and the driver 6 is shown as with his head inside of a substantially right angle corner defined by the two glare sheets so that he is fully protected from low rays.

Either sheet is adjustable from a vertical position to a horizontal one under the top of the machine.

Figure 2 shows my preferred construction of the shield suspension devices, and both shields are seen to be secured in frames 7 having a rod 8 along the upper edge.

At the outer ends these rods are supported in brackets 9 formed at 10 so they may be hooked over the upper frames respectively of the windshield and vehicle top and secured thereto by the screw 11.

Of course the specific means of attaching these brackets is not to be regarded as a limitation as many ways of accomplishing the desired result will be seen by any mechanic, but the point to be observed is that the rod is longitudinally movable in the bracket and also removable therein.

At the corner of the automobile where the rods 8 approach one another they are supported for independent rotation in a double corner bracket 12 formed at 13 to hook over the upper windshield frame or otherwise and to be secured by the screw 14.

This corner bracket really takes the form of a flat hinge jointed with a hinge pin at 15 so that the side portion 12' can assume any angle to the front portion 12 so as to align both shields respectively with the front and side of the automobile regardless of what the angle may be.

The adjacent ends of the rods 8 are revolvably supported one on each swinging portion of the bracket by a frictional clamping plate 16 curved to fit over the rod and clamped thereagainst by the single thumb screw 17 so that any frictional tension may be put upon either rod so as to hold either shield at any point of swinging adjustment.

The use of a single screw in each plate functions in the initial setting of the device as it provides for twisting of the clamping plate around the screw as a centre to insure proper alignment when installing the apparatus and also adapts either rod for easy removal upon loosening but one screw. In Figure 2 the dotted rod 8' designates its adjustability under the clamping plate around the screw 17.

The rods being tightly clamped by these plates will not become longitudinally displaced therein and being loosely slidable in the end brackets 9 are free to permit relative motion between the top and windshield frame as mentioned.

In considering my corner bracket it is evident that it may be arranged to secure to any desired part of the windshield or the frames, and in any manner, the showing being merely illustrative.

This corner bracket may take the form shown in Figure 3 wherein each rod 8 terminates in a ball 18 held in a socket 19 and each is independently tightened by a screw 20 so that the rods will pivot with proper frictional resistance to hold the shields adjusted. This construction provides for any variation to the angle of the top and windshield frame as described for the construction shown in Figure 2.

I claim:

A hinge bracket comprising leaves, a clamp on each leaf, a rod adjustably secured in each clamp for angular and endwise adjustment, a glare shield secured to each said rod.

GEORGE E. PHILLIPS.